United States Patent
Chiu

(10) Patent No.: US 10,386,514 B2
(45) Date of Patent: Aug. 20, 2019

(54) TARGET-ORIENTED PROCESS FOR ESTIMATING FRACTURE ATTRIBUTES FROM SEISMIC DATA

(71) Applicant: CONOCOPHILLIPS COMPANY, Houston, TX (US)

(72) Inventor: Stephen K. Chiu, Katy, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 329 days.

(21) Appl. No.: 14/808,785

(22) Filed: Jul. 24, 2015

(65) Prior Publication Data

US 2016/0025880 A1     Jan. 28, 2016

Related U.S. Application Data

(60) Provisional application No. 62/028,654, filed on Jul. 24, 2014.

(51) Int. Cl.
*G06F 19/00* (2018.01)
*G01V 1/30* (2006.01)

(52) U.S. Cl.
CPC .............. *G01V 1/306* (2013.01); *G01V 1/301* (2013.01); *G01V 1/305* (2013.01); *G01V 2210/626* (2013.01); *G01V 2210/6222* (2013.01); *G01V 2210/646* (2013.01)

(58) Field of Classification Search
CPC combination set(s) only.
See application file for complete search history.

(56) References Cited

U.S. PATENT DOCUMENTS

| | | |
|---|---|---|
| 2003/0167126 A1 | 9/2003 | Horne |
| 2009/0010105 A1 | 1/2009 | Sicking |
| 2010/0220895 A1 | 9/2010 | Koren |
| 2011/0255371 A1 | 10/2011 | Jing |

FOREIGN PATENT DOCUMENTS

WO    WO2016014995    1/2016

OTHER PUBLICATIONS

Stephen K. Chiu, Jason A Stein, Jack Howell, Samik Sil, Michael Davidson, and Jeff Malloy, 2012, Validate target-oriented VVAZ with formation microimaging, SEG Technical Program Expanded Abstracts: pp. 1-5.

(Continued)

*Primary Examiner* — Robert G Bachner
(74) *Attorney, Agent, or Firm* — ConocoPhillips Company

(57) ABSTRACT

Method for characterizing a subterranean formation includes: obtaining azimuth-dependent observed travel-times from measured seismic data; inverting observed travel-times to calculate a fracture attribute selected from the group consisting of: magnitude and orientation; identifying presence of fracture based on calculated fracture magnitude; identifying fracture direction based on calculated fracture orientation; calculating predicted travel-times; calculating differences or residual errors between observed travel-times and predicted travel-times; identifying potential fault locations based on residual errors; inverting fracture magnitude and orientation using travel-time differences between a shallower horizon to a deeper horizon of interest to minimize overburden artifacts.

20 Claims, 6 Drawing Sheets

$$T = T_0 + \alpha \cos 2(\theta - \beta)$$

Anisotropic

$T_0$ = isotropic travel time
$\beta$ = fracture strike (Vfast direction)
$\theta$ = source-receiver azimuth
$\alpha$ = fracture magnitude

(56) References Cited

OTHER PUBLICATIONS

Grechka, V., and I. Tsvankin, 1998, 3-D description of normal moveout in anistropic inhomogeneous media: Geophysics, 63, 1079-1092.
Jenner, E., 2010, Modelling azimuthal NMO in laterally heterogeneous HTI media: First Break vol. 28, No. 9, 89-94.
Stein, J., A., R. Wojslaw, T. Langston, and S. Boyer, 2010, Wide-azimuth land processing: Fracture detection using offset vector tile technology: The leading edge, Nov., 1328-1337.

Figure 1A
$T = T_0$, $\alpha = 0$
Isotropic
Figure 1B
$T = T_0 + \alpha \cos 2(\theta - \beta)$
Anisotropic
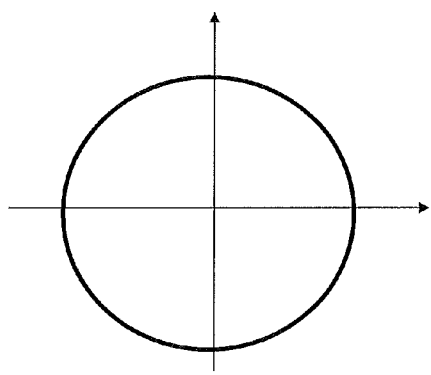
Fracture magnitude ($\alpha$) = 0
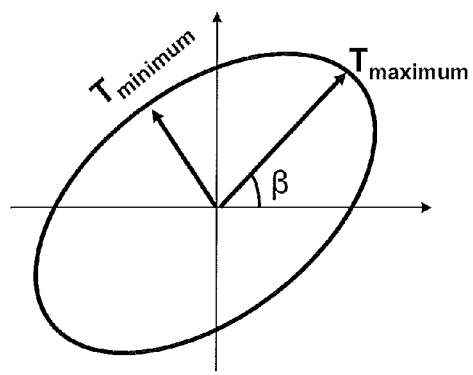
$T_0$ = isotropic travel time
$\beta$ = fracture strike (Vfast direction)
$\theta$ = source-receiver azimuth
$\alpha$ = fracture magnitude Figure 6A
Figure 6B
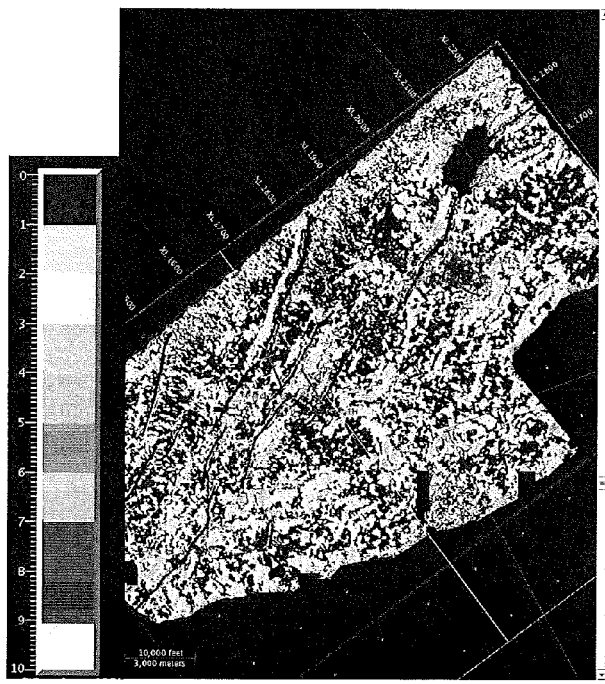 

TARGET-ORIENTED PROCESS FOR ESTIMATING FRACTURE ATTRIBUTES FROM SEISMIC DATA

CROSS-REFERENCE TO RELATED APPLICATIONS

This application is a non-provisional application which claims benefit under 35 USC § 119(e) to U.S. Provisional Application Ser. No. 62/028,654 filed Jul. 24, 2014, entitled "TARGET-ORIENTED PROCESS FOR ESTIMATING FRACTURE ATTRIBUTES FROM SEISMIC DATA," which is incorporated herein in its entirety.

FIELD OF THE INVENTION

The present invention relates generally to oil and gas exploration. More particularly, but not by way of limitation, embodiments of the present invention include tools and methods for estimating seismic anisotropy.

BACKGROUND OF THE INVENTION

In recent years, seismic anisotropy has become an increasingly important topic in geophysics. Seismic anisotropy refers to a directional dependence of seismic wave properties (e.g., velocity) in rock medium. When seismic waves propagate during seismic data acquisition, velocity of the waves may be faster in one direction while slower in another direction. This directional variation can indicate certain structures in the rock that are on the scale of the seismic wavelength. Rocks can exhibit anisotropic properties for a number of reasons including, but not limited to, the presence of fractures, preferred orientation of mineral grains, shape of isotropic minerals, and thin bedding of isotropic layers. In particularly, fracture characterization is a key attribute in optimizing hydrocarbon recovery. Understanding fracture distribution and orientation helps identify sweet spots, especially for unconventional resources and shale plays.

Seismic data can provide indirect measure of fracture attributes. Velocity variation with azimuth (VVAZ) is a fracture detection method used to characterize fractures by measuring velocity response of seismic waves against varying azimuth (e.g., variation of stacking velocities with source-receiver azimuth). Typically, VVAZ uses prestack primary wave (P-wave) travel times from various azimuths and offsets to reconstruct normal moveout (NMO) velocity ellipse along the time dimension. Long axis of the NMO velocity ellipse corresponds to the P-wave traveling along a fracture strike direction (fast P-wave velocity) while the short axis corresponds to the P-wave traveling perpendicular the fracture strike direction (slow P-wave velocity). Some studies have suggested that relative ratio of the long and short axes of the ellipse is proportional to fracture density while fracture orientation is related to rotation of the ellipse. (Grechka and Tsvankin, 1998, Jenner, 2010, and Stein et al., 2010).

Conventional techniques for estimating seismic anisotropy can suffer from one or more technical challenges. For example, seismic anisotropy estimation can be expensive, labor-consuming and/or computationally-intensive, particularly when determining azimuthal velocities in all three dimensions of prestack seismic data. In addition, fracture-attribute estimations also tend to be less reliable when prestack seismic data have significant coherent and background noise. In general, an improper understanding of seismic anisotropy can lead to a number of issues including incorrect positions of exploration targets and improper estimations of petroleum reservoir.

Recently, a target-oriented VVAZ method (Chiu et al, 2012) was proposed, which directly inverted horizontal transverse isotropy (HTI) magnitude and orientation in a fracture layer. This target-oriented VVAZ method requires picking travel times between the top and base of the fracture layer. The advantage of this method minimizes the overburden effects and produces more accurate fracture estimations. Use of differential travel times between the top and the bottom of the target may lead to a more robust inversion result, even for a relatively thin fracture layer.

BRIEF SUMMARY OF DISCLOSURE

The present invention relates generally to seismic exploration. More particularly, but not by way of limitation, embodiments of the present invention include tools and methods for estimating seismic anisotropy.

One example of a method for characterizing a fracture in a subterranean formation, the method comprising: obtaining azimuth-dependent observed travel-times from measured seismic data; inverting observed travel-times to calculate a fracture attribute selected from the group consisting of: magnitude and orientation; identifying presence of fracture based on calculated fracture magnitude; identifying fracture direction based on calculated fracture orientation; calculating predicted travel-times; calculating differences or residual errors between observed travel-times and predicted travel-times;

identifying potential fault locations based on residual errors; inverting fracture magnitude and orientation using travel-time differences between a shallower horizon to a deeper horizon of interest to minimize overburden artifacts.

Another example of a method for characterizing a subterranean formation, the method comprising: obtaining observed travel-times from seismic data; inverting, via computing processor, observed travel-times to calculate a fracture attribute selected from the group consisting of: magnitude and orientation, wherein presence of fracture is identified using calculated fracture magnitude and fracture direction is determined using calculated fracture orientation; calculating predicted travel-times; calculating differences or residual errors between observed travel-times and predicted travel-times; identifying potential fault locations based on residual errors; inverting fracture magnitude and orientation using travel-time differences between a shallower horizon to a deeper horizon of interest to minimize overburden artifacts.

BRIEF DESCRIPTION OF THE DRAWINGS

A more complete understanding of the present invention and benefits thereof may be acquired by referring to the follow description taken in conjunction with the accompanying drawings in which:

FIG. 1A-1B is an embodiment of the present invention: physical interpretation of azimuthal travel-time inversion.

FIG. 6A-6B is an embodiment of the present invention: an example of comparing fracture-magnitude maps with and without overburden effects

DETAILED DESCRIPTION

Figure 2B:
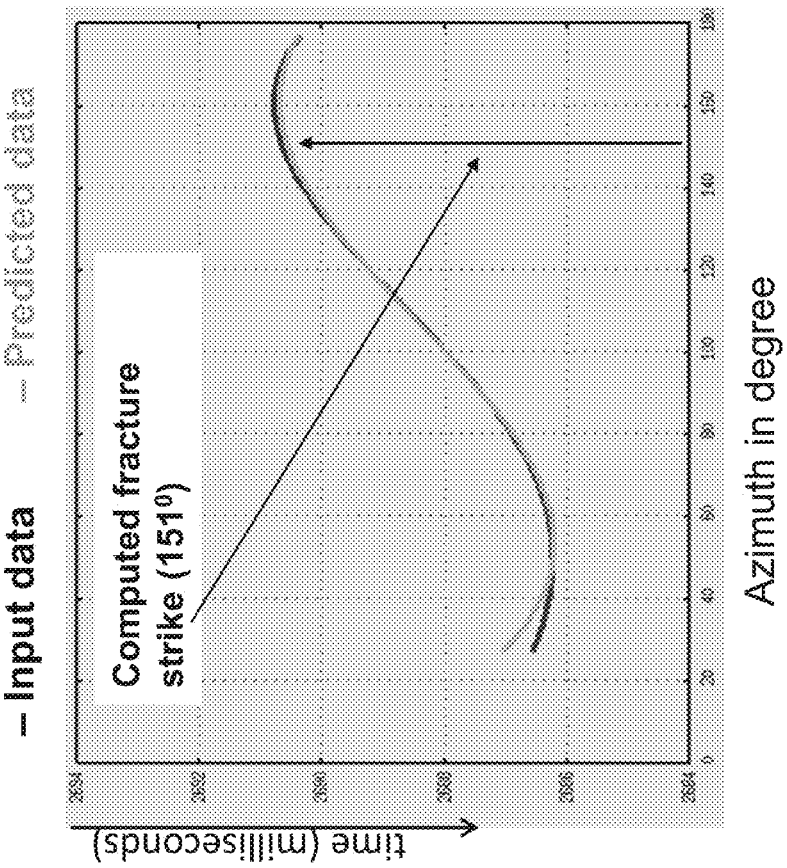
FIG. 2A-2B is an embodiment of the present invention: an example of elliptical fitting of picked travel times.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

The present invention provides a fast, target-oriented method for estimating seismic anisotropy. While conventional methods typically rely on 3D prestack data to determine azimuthal velocity variation, the present invention directly estimates seismic anisotropy without having to compute NMO velocity ellipse on the 3D prestack data. Instead, travel times from a targeted horizon of azimuthal (migrated or unmigrated) sectored stacks are used to directly derive physical attributes of the fracture via an inversion process.

Some of the advantages of the present invention include, but are not limited to:

- increasing signal-to-noise ratio of data to give more reliable fracture estimations
- reducing data dimension from 3D to a few targeted travel-time surfaces
- decreasing the processing time considerably to produce fracture estimations because of reducing data dimension
- producing horizon-consistent facture estimations
- reducing or removing overburden effects by using the travel-time difference or residual between azimuthal stack horizons from a shallower horizon to the horizon of interest
- identifying potential fault locations from residual-error map.

Other advantages will be apparent from the disclosure herein.

Equation (1) can be used to estimate seismic anisotropy:

$$T = T_0 + \alpha \cos 2(\theta - \beta) \quad (1)$$

where T=azimuthal travel time,
$T_0$=isotropic travel time,
$\alpha$=anisotropic magnitude,
$\theta$=source and receiver azimuth,
$\beta$=fracture direction (maximum travel time).

The parameters $T_0$, $\alpha$, and $\beta$ can be solved by a least-squares inversion. This inversion produces at least three output maps: facture magnitude, fracture direction, and residual fitting error.

Some embodiments provide a method for characterizing a subterranean formation, the method comprising: obtaining observed travel-times from seismic data; inverting observed travel-times to calculate a fracture attribute selected from the group consisting of magnitude and orientation, wherein presence of fracture is identified using calculated fracture magnitude and fracture direction is determined using calculated fracture orientation; calculating predicted travel-times; calculating differences or residual errors between observed travel-times and predicted travel-times; identifying potential fault locations based on residual errors; inverting fracture magnitude and orientation using travel-time differences between a shallower horizon to a deeper horizon of interest to minimize overburden artifacts.

FIG. 1A-1B illustrates how azimuthal velocity variation in travel time may relate to the presence of seismic anisotropy or fractures. In particular, FIG. 1 shows how equation 1 can be used to model the fracture attributes of the rock formations. If the rock is homogeneous without any fractures, a is zero. Thus the travel-time surface is a circle (FIG. 1A). However, if fractures are present in rock formations, the fractures cause the travel-time surface to become elliptical (FIG. 1B). This method derives the fracture attributes, $\alpha$ and $\beta$, by modeling the observed travel-time surface. Since $\alpha$ and $\beta$ directly connect to fracture magnitude and direction, the mapping of both parameters from a data set provides a spatial map showing how the fractures change locally with rock formations.

Figure 2A:
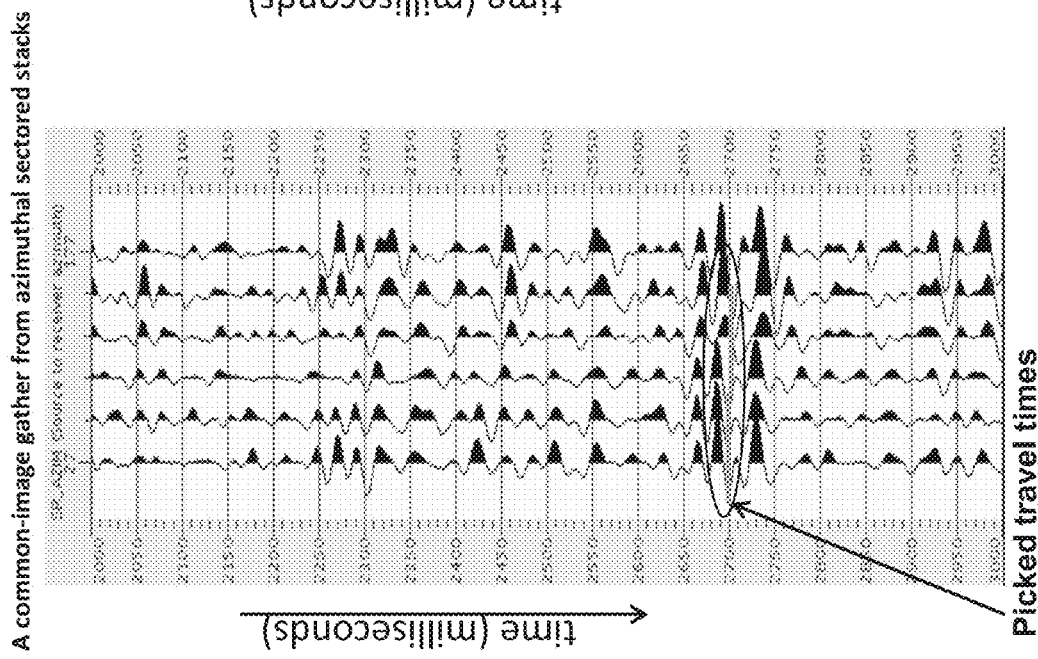

In an illustrative example, the present invention uses picked travel times of a common-image gather obtained from azimuthal sectored stacks (FIG. 2A) to compute the fracture attributes, $\alpha$ and $\beta$. Table 1, below, shows the inversion result. The average residual error is only 0.4 msec which is below the 2 msec sampling rate of this data set. FIG. 2B also shows a graphic comparison between observed travel times and travel times predicted from equation 1. The match between observed and predicted values is remarkably similar.

TABLE 1

| Source-receiver azimuth (°) | Input travel time (msec) | Predicted travel time (msec) |
|---|---|---|
| 27 | 2686.6 | 2687.1 |
| 57 | 2685.7 | 2685.0 |
| 87 | 2685.9 | 2686.3 |
| 117 | 2689.5 | 2689.6 |
| 147 | 2692.0 | 2691.6 |
| 177 | 2690.3 | 2690.4 |

Computed fracture strike ($\beta$) is 151 degree from the North.

Computed fracture magnitude ($\alpha$) is 0.24.

Average residual travel-time error is 0.4 msec.

Faults generally exist in rock formations. If a fault plane is present in rock formations, it causes discontinuity of travel-time surface as a function of azimuths within a common-image gather or a common midpoint gather obtained from azimuthal sectored stacks. The discontinuity of travel times, in turn, creates large residual errors between the observed travel times and travel times predicted from equation 1. The large residual errors from the inversion are the key to be used in identifying potential fault locations. Table 2, below, illustrates an example of inverting travel-time picks across a fault plane. The travel-time discontinuity, for example, occurs between source and receiver azimuths of 57° and 87°. As a result, the travel-time discontinuity creates an average large residual error of 14.6 msec when comparing with a much smaller residual error of 0.4 msec in Table 1. The residual-error map is an effective way to be used in identifying the presence of fault locations.

TABLE 2

| Source-receiver azimuth (°) | Input travel time (msec) | Predicted travel time (msec) |
|---|---|---|
| 27 | 2340.6 | 2351.9 |
| 57 | 2340.9 | 2346.2 |
| 87 | 2373.1 | 2351.6 |
| 117 | 2339.2 | 2361.4 |
| 147 | 2372.6 | 2367.1 |
| 177 | 2373.5 | 2362.3 |

Computed fracture strike ($\beta$) is 148 degree from the North.
Computed fracture magnitude ($\alpha$) is 10.4.
Average residual travel-time error is 14.6 msec.

Example 1

Figure 3:
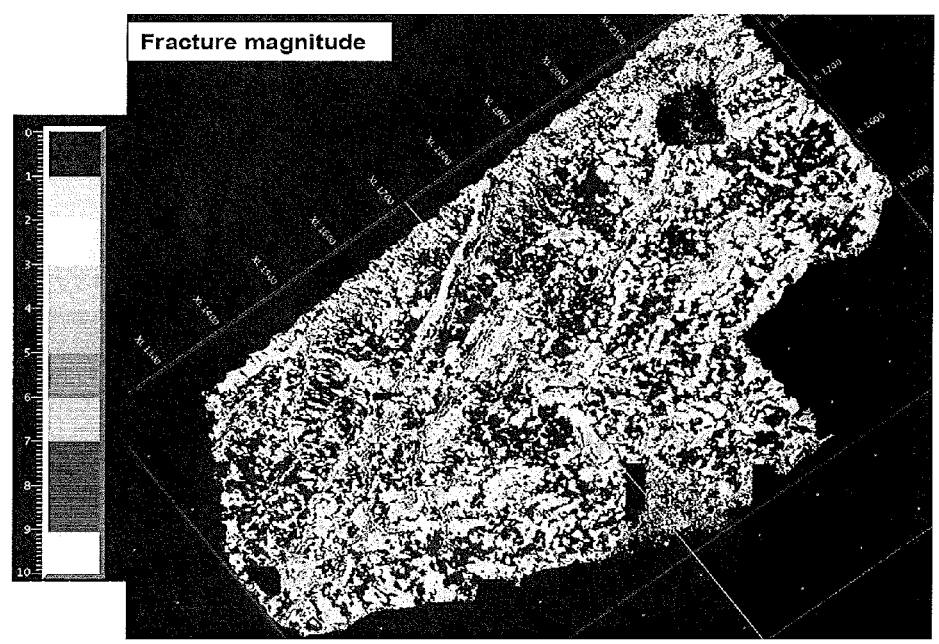
FIG. 3 is an embodiment of the present invention: an example of fracture-magnitude map.
Figure 4:
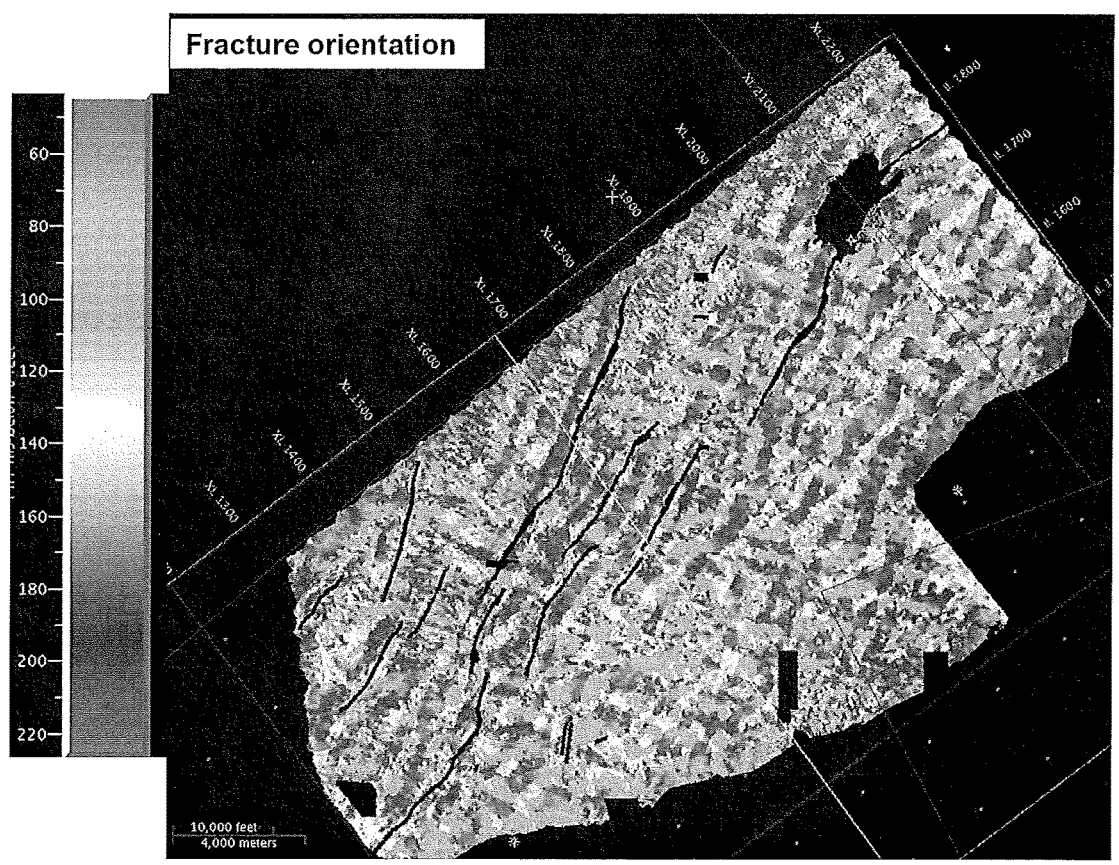
FIG. 4 is an embodiment of the present invention: an example of fracture-orientation map.
Figure 5:
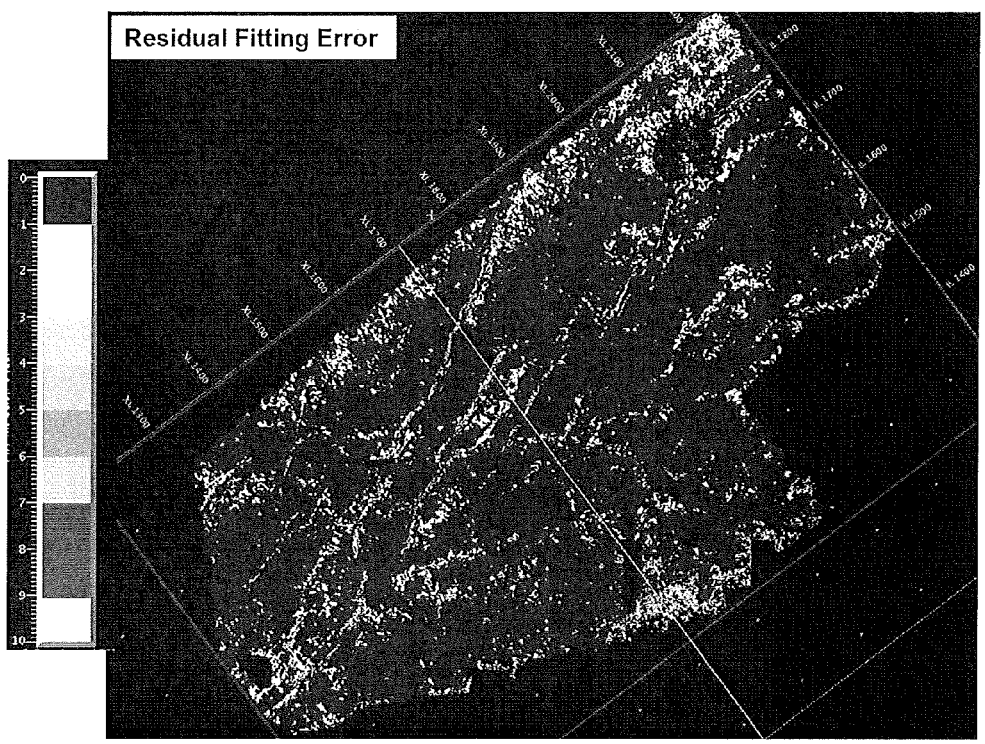
FIG. 5 is an embodiment of the present invention: an example of residual-error map.

FIGS. 3-5 illustrate an example of mapping inverted fracture magnitudes (FIG. 3), fracture orientations (FIG. 4) and residual fitting errors (FIG. 5). These maps can be used to highlight the fracture attributes. Fault locations can be best seen in FIG. 4 (black lines). As illustrated, the residual-fitting-error trends (FIG. 5) followed closely with fault locations in FIG. 4. The identification of fault locations helps to reduce drilling risk and to optimize reservoir production.

This invention also addresses how to minimize the overburden effect that affects the result of travel-time inversion. The seismic waves have to travel through the overburden layers first to reach a deeper target horizon. If the travel times of overburden layers are not corrected, the overburden will impose a footprint on the deeper horizon. The invention also adopts a similar approach as the target-oriented VVAZ method that uses differential travel times between the top and the bottom of the target horizon. However, the invention here employs a completely different mathematical model and input data when compared with the target-oriented VVAZ method. The approach of using differential travel times in equation 1 minimizes the overburden effect and produces more reliable fracture-attribute estimations. The overburden artifacts may be minimized using travel-time differences between a shallower horizon to a deeper horizon of interest. In some embodiments, the overburden artifacts are minimized using travel-time differences between the top and bottom of a target layer.

In one embodiment, fracture magnitude and fracture orientation within a number of layers are calculated using travel-time differences between a shallower horizon to a deeper horizon of interest. In one embodiment, fracture magnitude and fracture orientation within a target layer are calculated using travel-time differences between the top and bottom of a target layer.

Example 2

FIG. 6 shows a comparison of fracture-attribute maps derived from a travel-time surface of a horizon (FIG. 6A) vs. the differential travel times between the top and the bottom of the target horizon (FIG. 6B). The fracture map derived from differential travel times significantly reduces the overburden footprint and provides more reliable fracture estimations that are related to the fractures of the target horizon but not the overburden artifacts.

According to one embodiment, the present invention can be used to scan for potential fault locations. If the azimuthal travel-time surfaces change abruptly across a fault plane, the travel-time changes also create large residual fitting errors associated with a fault location.

Azimuthal velocity variation in travel time can be a good indicator of the presence of seismic anisotropy or fractures. According to one or more embodiments, the present invention provide a method that utilizes travel times from target horizons of azimuthal sectored stacks to invert for fracture attributes.

The target-oriented travel-time inversion provides a fast, target-oriented method for estimating seismic anisotropy by using azimuthal (migrated or unmigrated) sectored stacks instead of prestack seismic data. Since this method bases on picking travel times on seismic horizons, it produces horizon-consistent facture estimations. The residual error map derived from this invention provides an alternative way to identify potential fault locations. In addition, this invention also addresses how to minimize the overburden effect that affects the result of travel-time inversion. It utilizes the differential travel times between the top and the bottom of the target horizon to estimate fracture attributes. The fracture map derived from the differential travel times gives more reliable fracture estimations that are related to the fractures of target horizon but not the overburden artifacts.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. Stephen K. Chiu, Jason A Stein, Jack Howell, Samik Sil, Michael Davidson, and Jeff Malloy, 2012, Validate target-oriented VVAZ with formation microimaging, SEG Technical Program Expanded Abstracts: pp. 1-5.
2. Grechka, V., and I. Tsvankin, 1998, 3-D description of normal moveout in anistropic inhomogeneous media: Geophysics, 63, 1079-1092.
3. Jenner, E., 2010, Modelling azimuthal NMO in laterally heterogeneous HTI media: First Break volume 28, No. 9, 89-94.
4. Stein, J., A., R. Wojslaw, T. Langston, and S. Boyer, 2010, Wide-azimuth land processing: Fracture detection using offset vector tile technology: The leading edge, November, 1328-1337.

The invention claimed is:
1. A computer-implemented method for characterizing a subterranean formation, the method comprising:
obtaining azimuth-dependent observed travel times from measured seismic data;
inverting the observed travel times to calculate a fracture magnitude and a fracture orientation;
identifying presence of fracture based on the fracture magnitude;

identifying fracture direction based on the fracture orientation;
calculating predicted travel times;
calculating residual errors between the observed travel times and the predicted travel times;
identifying potential fault locations based on the residual errors;
inverting the fracture magnitude and the fracture orientation using travel-times differences between a shallower horizon to a deeper horizon of interest to yield a result; and
producing a horizon-consistent fracture estimation based on the result,
wherein the potential fault locations are indicated by a residual difference between the observed travel times and the predicted travel times.

2. The method of claim 1,
wherein,
the fracture magnitude ($\alpha$) and the fracture orientation ($\beta$) are calculated using equation $T=T_0+\alpha \cos 2(\theta-\beta)$, and
T is azimuthal travel time, $T_0$ is isotropic travel time, and $\theta$ is source and receiver azimuth.

3. The method of claim 1, wherein the observed travel times are obtained from a common-image gather from azimuthal sectored stacks.

4. The method of claim 3, wherein the azimuthal sectored stacks are migrated or unmigrated.

5. The method of claim 1, wherein the predicted travel times are calculated using equation $T=T_0+a \cos 2(\theta-\beta)$.

6. The method of claim 1, wherein the fracture magnitude and the fracture orientation within a number of layers are calculated using the travel-times differences between the shallower horizon to the deeper horizon of interest.

7. The method of claim 1, wherein the fracture magnitude and the fracture orientation within a target layer are calculated using the travel-times differences between a top and a bottom of the target layer.

8. The method of claim 7, wherein overburden artifacts are minimized using the travel-times differences between the top and the bottom of the target layer.

9. A method for characterizing a subterranean formation, the method comprising:
obtaining observed travel times from seismic data;
inverting, via computing processor, the observed travel times to calculate a fracture magnitude and a fracture orientation, wherein a fracture is identified using the fracture magnitude and a fracture direction is determined using the fracture orientation;
calculating predicted travel times;
calculating residual errors between the observed travel times and the predicted travel times;
identifying potential fault locations based on the residual errors;
inverting the fracture magnitude and the fracture orientation using travel times differences between a shallower horizon to a deeper horizon of interest to yield a result;
producing a horizon-consistent fracture estimation based on the result,
wherein the potential fault locations are indicated by a residual difference between the observed travel times and the predicted travel times.

10. The method of claim 9,
wherein,
the fracture magnitude ($\alpha$) and the fracture orientation ($\beta$) are calculated using equation $T=T_0+a \cos 2(\theta-\beta)$, and
T is azimuthal travel time, $T_0$ is isotropic travel time, and $\theta$ is source and receiver azimuth.

11. The method of claim 1, wherein the observed travel times are obtained from a common-image gather from azimuthal sectored stacks.

12. The method of claim 11, wherein the azimuthal sectored stacks are migrated or unmigrated.

13. The method of claim 1, wherein the predicted travel times are calculated using equation $T=T_0+a \cos 2(\theta-\beta)$.

14. The method of claim 9, wherein the fracture magnitude and the fracture orientation within a number of layers are calculated using the travel time differences between the shallower horizon to the deeper horizon of interest.

15. The method of claim 9, wherein the fracture magnitude and the fracture orientation within a target layer are calculated using the travel time between a top and a bottom of the target layer.

16. The method of claim 15, wherein overburden artifacts are minimized using the travel-times differences between the top and the bottom of the target layer.

17. The method of claim 1, wherein the potential fault locations are indicated by the residual difference between the observed travel times and the predicted travel times larger than an average residual difference of the measured seismic data.

18. The method of claim 9, wherein the potential fault locations are indicated by the residual difference between the observed travel times and the predicted travel times larger than an average residual difference of the measured seismic data.

19. The method of claim 1, wherein a plurality of potential fault locations are indicated by respective residual differences between the observed travel times and the predicted travel times larger than an average residual difference of the measured seismic data.

20. The method of claim 9, wherein a plurality of potential fault locations are indicated by respective residual differences between the observed travel times and the predicted travel times larger than an average residual difference of the seismic data.

* * * * *